United States Patent
Vijayan et al.

(10) Patent No.: US 12,519,837 B2
(45) Date of Patent: Jan. 6, 2026

(54) POLICY-BASED APPLICATION OF A POINT-TO-POINT SECURITY PROTOCOL TO A NETWORK FLOW FROM A SOURCE APPLICATION

(71) Applicant: HEWLETT PACKARD ENTERPRISE DEVELOPMENT LP, Spring, TX (US)

(72) Inventors: Renjith Vijayan, Bangalore (IN); Abhay Bhaskar, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 139 days.

(21) Appl. No.: 18/493,015

(22) Filed: Oct. 24, 2023

(65) Prior Publication Data

US 2025/0071146 A1    Feb. 27, 2025

(30) Foreign Application Priority Data

Aug. 23, 2023   (IN) .............................. 202341056579

(51) Int. Cl.
*H04L 9/40* (2022.01)

(52) U.S. Cl.
CPC .......... *H04L 63/20* (2013.01); *H04L 63/0435* (2013.01); *H04L 63/102* (2013.01)

(58) Field of Classification Search
CPC .... H04L 63/20; H04L 63/0435; H04L 63/102
See application file for complete search history.

(56) References Cited

U.S. PATENT DOCUMENTS

| 8,418,241 | B2 | 4/2013 | Elzur |
| 8,719,567 | B2 | 5/2014 | Weis et al. |
| 8,995,289 | B2 | 3/2015 | Diab et al. |
| 9,871,766 | B2 | 1/2018 | Syed Mohamed et al. |
| 9,912,699 | B1 * | 3/2018 | Hebbar ................. H04L 69/326 |
| 10,469,461 | B1 | 11/2019 | Singh et al. |
| 10,701,582 | B2 * | 6/2020 | Henry ................. H04L 41/0894 |
| 11,368,392 | B2 * | 6/2022 | Dai ..................... H04L 12/4641 |
| 11,956,154 | B2 * | 4/2024 | Madathilparambil George .......... G06F 13/4282 |

(Continued)

OTHER PUBLICATIONS

IEEE, "802.1AE-2018—IEEE Standard for Local and metropolitan area networks-Media Access Control (MAC) Security", Dec. 2018, 4 pages.

(Continued)

*Primary Examiner* — Harris C Wang
(74) *Attorney, Agent, or Firm* — Hewlett Packard Enterprise Patent Department

(57) ABSTRACT

Some examples relate to applying a point-to-point security protocol to a network flow from a source application. In an example implementation, a network device can receive a network flow from a network client on a network. The network device can analyze a network packet of the network flow. Based on the analysis, the network device can identify a source application of the network flow. The network device can then refer to a lookup table in an integrated circuit (IC) on the network device that includes a point-to-point security protocol (PSP)-related policy for the source application. Based on the PSP policy in the lookup table, the network device can abstain from applying PSP-based encryption to the network flow from the source application.

20 Claims, 6 Drawing Sheets

(56) References Cited

U.S. PATENT DOCUMENTS

| | | | |
|---|---|---|---|
| 2004/0249975 A1* | 12/2004 | Tuck | H04L 61/35 |
| | | | 709/245 |
| 2014/0134995 A1* | 5/2014 | Yu | H04W 12/0431 |
| | | | 455/419 |
| 2015/0030029 A1 | 1/2015 | Mohamed et al. | |
| 2015/0207793 A1 | 7/2015 | Mohamed et al. | |
| 2017/0374106 A1* | 12/2017 | Hamou | H04L 41/0803 |
| 2018/0302269 A1 | 10/2018 | Sankaran et al. | |
| 2019/0386824 A1 | 12/2019 | Havaralu Rama Chandra Adiga et al. | |
| 2020/0028880 A1* | 1/2020 | Sood | H04Q 9/00 |
| 2020/0143088 A1* | 5/2020 | Sunkavalli | H04L 63/08 |
| 2020/0371846 A1* | 11/2020 | Halén | G06F 9/5083 |
| 2021/0176255 A1 | 6/2021 | Hill et al. | |
| 2022/0069618 A1* | 3/2022 | Gordon | H04L 63/0428 |
| 2022/0069619 A1* | 3/2022 | Gordon | H04L 9/0822 |
| 2023/0208818 A1* | 6/2023 | Cavaliere | H04L 69/322 |
| | | | 726/26 |
| 2025/0071146 A1* | 2/2025 | Vijayan | H04L 63/20 |
| 2025/0227511 A1* | 7/2025 | Chai | G06N 99/00 |

OTHER PUBLICATIONS

IEEE, "IEEE Standard for Local and metropolitan area networks—Port-Based Network Access Control", Feb. 2020, 4 Pages.

* cited by examiner

| Application ID | PSP-related policy |
|---|---|
| 156# *(for Github)* | 0 |
| Y56& *(for YouTube)* | 1 |
| #ER% *(for Netflix)* | 1 |
| 666! *(for MS Outlook)* | 0 |
| @556 *(for Facebook)* | 1 |

POLICY-BASED APPLICATION OF A POINT-TO-POINT SECURITY PROTOCOL TO A NETWORK FLOW FROM A SOURCE APPLICATION

BACKGROUND

An enterprise's network acts as a highway for all data traffic that facilitates movement, storage, and access to data. Considering the importance of data in today's world, the security of an enterprise network becomes vital. Enterprises are increasingly focusing on securing networks from the inside.

BRIEF DESCRIPTION OF THE DRAWINGS

FIG. 2 illustrates a lookup table, according to some examples;

DETAILED DESCRIPTION

Figure 1:
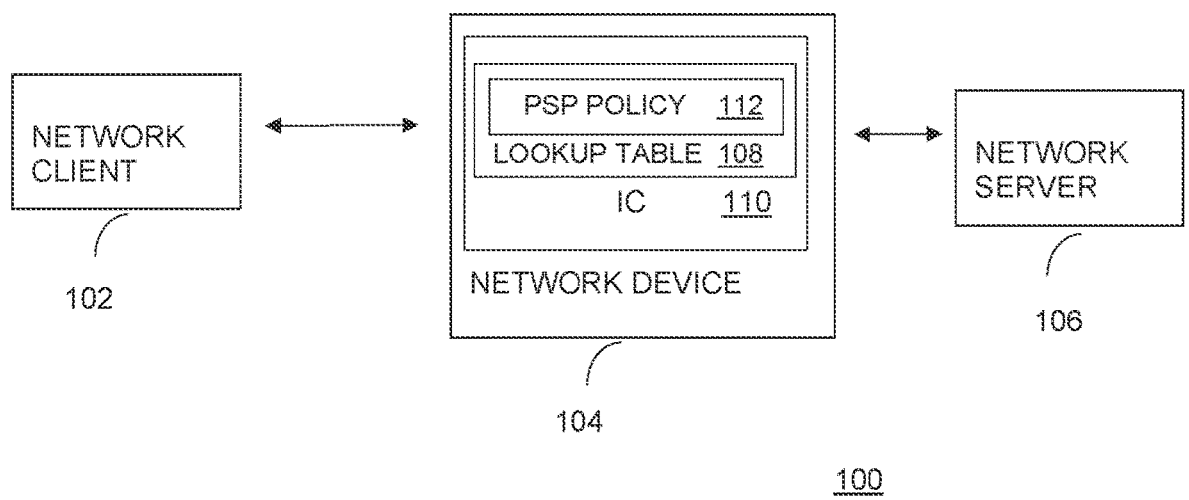
FIG. 1 is a block diagram of a computing environment for applying a point-to-point security protocol to a network flow from a source application, according to some examples.

Enterprise network security can protect a company's data and resources from malicious activities. Threats, such as malware, computer worms, computer viruses, and other cyber-attacks, can take many forms. Enterprise security solutions can protect a company's data from these threats by detecting and blocking them before they cause damage.

Enterprise network security is the array of security measures taken by an enterprise to prevent and resolve real-time attacks on enterprise data. Enterprise network security aims to protect company applications, data, and infrastructure from online threats. One such enterprise network security measure is point-to-point security protocol (PSP). As used herein, "point-to-point security protocol (PSP)" refers to a network security protocol that operates at the medium access control layer and provides point-to-point security on Ethernet links. An example of a point-to-point security protocol is the Media Access Control security (MACsec) protocol.

MACsec is a network security protocol that provides point-to-point security on Ethernet links. MACsec is defined by IEEE standard 802.1AE. MACsec specifies how to secure all or part of a local area network (LAN) at the link layer. MACsec executes the encryption function in the physical layer (PHY) of an Ethernet port and offers encryption equal to that of the Ethernet port rates regardless of the packet size. MACsec can secure participating entities (for example, network devices) using the MACsec Key Agreement (MKA) protocol.

MACsec on enterprise networks is deployed to protect traffic between directly connected network devices that carry traffic over the internet. When MACsec is enabled on a point-to-point Ethernet link, the link is secured after matching security keys are exchanged and verified between the interfaces at each end of the link. The keys can be configured manually or generated dynamically. MACsec provides MAC-layer encryption by using out-of-band methods for encryption keying. The MACsec Key Agreement (MKA) Protocol manages the encryption keys. Network administrators can configure a Pre-Shared Key (PSK) on both network devices. Once MKA is secured on the link, a secure association key (SAK), which secures data plane traffic, is programmed in the hardware to set up a MACsec channel. Subsequently, all the traffic on the link apart from the MKA frames is protected by MACsec.

However, there are technical challenges in using MACsec on a network. MACsec adds a 32-byte header to each Ethernet frame that is protected by MACsec. This in turn brings down the link capacity. The "link capacity" refers to the maximum quantity of traffic or signal that may pass over a particular infrastructure channel. When MACsec is used the link capacity can go down to 70% for 64-byte frames and 90% for 256-byte frames. MACsec also requires a packet to go through an encryption operation on the transmit side and a decryption operation on the receive side, which adds latency. In the case of time-sensitive application traffic such as audio and video, it can potentially create a jittery experience. Network latency refers to the amount of time it takes for a data packet to go from one place to another.

The increase in applications that use a network (e.g., the internet) have resulted in large amounts of data entering an enterprise network. Not all data that enters an enterprise network may be required to be secured via MACsec. For example, entertainment application traffic (such as Netflix and YouTube) destined to the internet may not contain sensitive data associated with an enterprise.

In one example, the filtering available today to bypass MACsec for a particular frame is based on the source and destination MAC address and the Ethertype (a two-octet field) in an Ethernet frame. There does not exist a mechanism for a network administrator to selectively choose what applications on the link should (or should not) be protected by MACsec.

It is desirable to have a mechanism for selectively protecting end-user traffic at the edge based on the application associated with the user flow to reduce the number of frames that are to be protected by MACsec on a link. The proposed solution leverages Deep Packet Inspection (DPI) to identify network applications associated with flows in an enterprise network. A DPI engine is used to inspect the first few packets of a flow. Once the source application of a flow is recognized, application recognition is combined with user-defined application-specific policies on a chip (e.g., application-specific integrated circuit (ASIC) to determine whether the network flows from the source application should be encrypted on a downlink port of a network device (e.g., network switch).

In an example implementation, a network device can receive a network flow from a network client on a network. The network device can analyze a network packet of the network flow. Based on the analysis, the network device can identify a source application of the network flow. The network device can then refer to a lookup table in an integrated circuit (IC) on the network device that includes a point-to-point security protocol (PSP)-related policy for the source application. Based on the PSP policy in the lookup table, the network device can abstain from applying PSP-based encryption to the network flow from the source application.

The proposed solution increases link capacity while still using a point-to-point security protocol (e.g., MACsec) to secure critical application traffic. This in turn brings down the need for higher bandwidth on uplink ports to absorb the overhead that a point-to-point security protocol brings in.

The proposed solution also reduces latency for certain applications, for example, audio and video applications (e.g., YouTube, Netflix, and Facebook), that do not require to be protected by a point-to-point security protocol.

Referring now to the figures, FIG. 1 is a block diagram of a computing environment 100 that includes a network client 102, a network device 104, and a network server 106. In the example of FIG. 1, one network client 102, one network device 104, and one network server 106 are depicted for simplicity. In some examples, computing environment 100 may include a different number of network clients, network devices, and network servers.

As used herein, a "network client" refers to a computer hardware or software (machine executable instructions) that requests access to a service provided by another device on a network. Examples of the network client 102 can include a workstation, a desktop computer, a notebook computer, a thin client, a Voice over Internet Protocol (VoP) phone, a security camera, or any other processing device. The network client 102 can include a processor(s). The processor(s) can further include a core(s). The "core" refers to a processing unit built into a processor (or socket) that can independently perform or process a computational task.

The network client 102 can host an application (machine executable instructions) or multiple applications. As used herein, an "application" refers to a computer program designed to carry out a specific task other than one relating to the operation of the computer itself. Examples of the application can include a word processor (e.g., MS Word), a media player application (e.g., VLC player), a video sharing application (e.g., YouTube), a content streaming application (e.g., Netflix), and a social media application (e.g., Facebook).

An application can perform various tasks such as data creation, data modification, data storage, data transfer, or the like. In an example, the application on the network client 102 can generate a network flow. As used herein, a "network flow" refers to a sequence of packets traversing a network that share a set of header field values. For example, a network flow could include each of the packets with the same source and destination IP addresses, or each of the packets with the same virtual local area network (VLAN) identifier (VLANID). A VLAN ID is used for VLAN identification and is, for example, a 12-bit field specifying the VLAN to which an Ethernet frame belongs. In an example, when an application generates a network flow, the application can be referred to as "source application".

As used herein, a "network device" refers to an electronic device which is used for communication and interaction between devices on a computer network. In the example of FIG. 1, the network device 104 can include a network switch, a network router, a gateway device, or any other network device. In an example, the network device 104 can include a processor (or multiple processors) and a storage medium. The processor can include a Central Processing Unit (CPU), a microprocessor, a programmable gate array, a microcontroller, or any other processing logic that interprets and executes machine-readable instructions stored in storage medium.

As used herein, a "network server" refers to a computer hardware or software (machine executable instructions) that provides functionality for other programs or devices (e.g., network client 102). Network server 106 can provide various functionalities such as sharing data or resources among multiple clients or performing computations for a client (e.g., network client 102). Examples of the network server 106 can include a database server, a file server, a mail server, a print server, a web server, a game server, a video sharing server, a content streaming server, and a social media server.

The network client 102, the network device 104, and the network server 106 can be communicatively coupled via a network. The network can be a local area network (LAN), a wide area network (WAN), a storage area network (SAN), a campus area network (CAN), the internet, or any other type of network. In some examples, the network client 102, the network device 104, and the network server 106 can be part of separate networks such as separate LANs or WANs. In some examples, the network client 102, the network device 104, and the network server 106 can be located in different geographical locations.

In some examples, the network client 102, network device 104, and the network server 106 can be physically connected devices, for example, via a LAN cable through an Ethernet. Ethernet is a wired computer networking technology for connecting a number of devices (such as network client 102) to form a local area network, with protocols to control the passing of information and to avoid simultaneous transmission by two or more devices.

In an example, the network device 104 is capable of applying a point-to-point security protocol (PSP). As used herein, "point-to-point security protocol (PSP)" refers to a network security protocol that operates at the medium access control (MAC) sublayer and provides point-to-point security on Ethernet links. The medium access control sublayer is a sublayer of the data link layer of the open system interconnections (OSI) reference model for data transmission. The MAC sublayer controls the hardware responsible for interaction with a wired, optical or wireless transmission medium. The MAC sublayer and the logical link control (LLC) sublayer together make up the data link layer. An example of point-to-point security protocol is Media Access Control security (MACsec) protocol.

MACsec is a network security protocol that provides point-to-point security on Ethernet links. MACsec is defined by IEEE standard 802.1AE. MACsec provides authentication, confidentiality and integrity for data transported on point-to-point links in an enterprise network using the Advanced Encryption Standard (AES). MACsec provides authentication by ensuring that only known nodes are allowed to communicate on a LAN. MACsec provides confidentiality through encryption of the data so only endpoints with the correct encryption key can see the contents.

The MACsec key agreement is an associated protocol that provides multiple authentications between hosts (e.g., network client 102 and network device 104) in a network (e.g., network server 106). MACsec adds a security tag and an integrity check value to each Ethernet frame that provides integrity to all the frames and confidentiality to the user data. Integrity is provided through a cryptographic mechanism ("MACsec encryption") ensuring that data has not been tampered with or corrupted while in motion.

As mentioned earlier, MACsec operates at the data link layer. MACsec encapsulates IP packets with, for example, a 16-byte MACsec SecTag header and 16-byte Integrity Check Value (ICV) tail and uses a special EtherType (0x88E5). In the MAC layer, the preamble and Cyclic Redundancy Check (CRC) are added to the Ethernet frame before transmission.

In an example, the network device 104 can include one or more lookup tables 108. As used herein, a "lookup table" refers to a list of values that are stored in the memory of a hardware component (e.g., integrated circuit (IC)) 110 that can be accessed using software (machine-executable instructions). In an example, the hardware component can "look up" what the output(s) is for a given input(s). An "integrated circuit (IC)" is a set of electronic circuits on a piece (or "chip") of semiconductor material, usually silicon. Multiple miniaturized transistors and other electronic components can be integrated together on an IC. FIG. 2 illustrates a lookup table, according to an example.

In an example, the application on the network client 102 can generate a network flow. The network flow can be generated, for example, when the application wants to communicate with another device (e.g., network server 106) on the network for sending/or receiving data. For example, an email application may generate a network flow when the email application wants to send a message to the network server 106. In another example, a video sharing application (e.g., YouTube) may generate a network flow when the video sharing application wants to share a video with the network server 106. In a further example, a social media application may generate a network flow when the social media application wants to post a message to the network server 106.

A network flow can include one or more network packets. A network packet can also be referred to as datagram, segment, block, cell, or frame depending on the protocol used for transmission. A network packet is a basic unit of communication over a network. A network packet can be divided, for example, into three parts: header, payload, and trailer. The size and structure of a network packet are dependent on the underlying network structure or protocol used.

Figure 3:
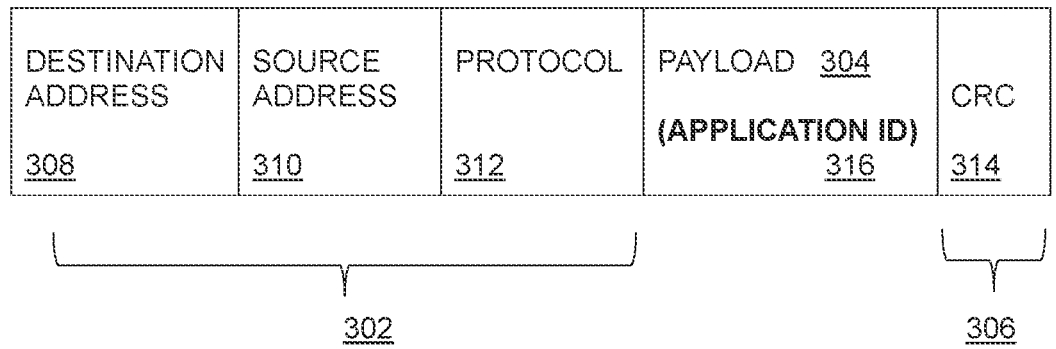
FIG. 3 illustrates a network packet, according to some examples.
Figure 3:
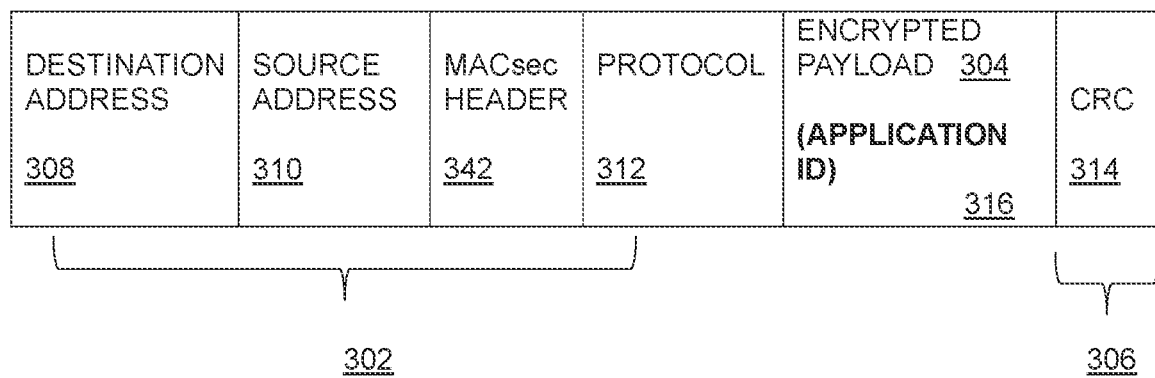

In an example, the network client can include an application ID in the network packets of a network flow from an application. As used herein, an "application ID" refers to a unique value assigned to an application, which is used to identify the application. The application ID can be, for example, a string of alphabets, numerals, special characters (e.g., @ and #) or alphanumeric characters. For example, application ID "1455" can be used to represent the YouTube application. In another example, application ID "ab46" can be used to designate the Facebook application. In a like manner, each application can be assigned a unique ID. In an example, the application ID can be included in the payload of a network packet. FIG. 3 illustrates a network packet including an application ID, according to an example.

Once an application on the network client generates a network flow, the network client can send the network flow to the network device 104 via the network. The network device 104 can receive the network flow from the network client and proceed to analyze the network packets present therein. In an example, the network device 104 can analyze a network packet(s) by performing a deep packet inspection (DPI) of the network packet(s).

As used herein "deep packet inspection (DPI)" refers to a type of data processing that inspects in detail the data being sent over a computer network. DPI is a method of examining the content of network packets. DPI includes analysis of packet headers and protocol fields. DPI looks at a range of data and metadata associated with individual packets and the network device 104 can use different ways to acquire packets for deep packet inspection. One example technique is port mirroring, which can be used by the network device 104 to send a copy of network packets seen on one port to a network monitoring connection on another port. Another example technique involves physically inserting a network tap (a dedicated hardware device) which duplicates and sends the data stream to an analyzer tool for inspection. These are some examples of carrying out a DPI to extract the application ID from network packets. They will not cause bandwidth overhead since a DPI may be carried out even with one packet. The bandwidth loss that current implementations are trying to address is caused due to MACsec encryption of all packets irrespective of the type of the application, which leads to the addition of a 32-byte MACsec header to each frame, as mentioned earlier.

In an example, by performing a DPI, the network device 104 can extract an application ID from the network packets. Once the network device 104 extracts an application ID from the network packets, the network device 104 can refer to a lookup table 108 in an integrated circuit (IC) 110 of the network device 104. An "integrated circuit (IC)" is a set of electronic circuits on a piece (or "chip") of semiconductor material, usually silicon. In an example, a lookup table in the IC includes a mapping between the application ID of an application and a PSP-related policy 112 for the application. FIG. 2 illustrates the mapping in a lookup table, according to an example.

The network device 104 can refer to a lookup table in the IC to identify, based on the application ID, a point-to-point security protocol (PSP)-related policy for the application ID. In other words, the network device 104 can identify the PSP-related policy for the source application of the network packets, based on the application ID, since the application ID represents the source application.

As mentioned earlier, the "point-to-point security protocol (PSP)" refers to a network security protocol that operates at the medium access control layer and provides point-to-point security on Ethernet links. An example of point-to-point security protocol is MACsec protocol. A PSP-related policy for an application is defined in a lookup table to enable the network device 104 to determine an action related to the policy on the network flow of the application, which is received by the network device 104.

Once the network device 104 refers to the lookup table and identifies the PSP-related policy for the application ID, the network device 104 can take an action based on the PSP-related policy. In an example, the action can include applying the PSP to a network flow of the application, which is received by the network device 104. In an example, applying the PSP to a network flow of the application can include applying MACsec (including MACsec encryption) to the network flow of the application. As used herein, MACsec encryption refers to an encryption executed in the physical layer (PHY) of an Ethernet port.

MACsec is defined by IEEE 802.1AE standard. MACsec uses a combination of data integrity checks and encryption (or "MACsec encryption") to secure the data that is transmitted. MACsec authenticates Ethernet endpoints (e.g., network device 104 and network server 106) prior to sending MACsec frames over a network. The authenticated MACsec peer devices on the same network belong to a Connectivity Association (CA). This means that these MACsec peer devices are connected and are allowed to communicate with each other. CA member devices identify themselves using a long-lived Connectivity Association Key (CAK). MACsec frames are transported over Secure Channels (SCs), which are supported by Secure Associations (SAs). A "SecY" is the entity that operates the MACsec protocol on a network port. An SecY instance is associated with a specific virtual port. Each SecY and virtual port have one transmit-SA and one receive-SA for each peer device connected to the Ethernet port. Each SA uses a separate Security Association Key (SAK) to encrypt and authenticate frames.

The long-lived CAK is used to generate short-lived SAKs for protecting data transferred between peers. The SAKs are regularly updated based on the number of packets transmitted. MACsec uses Advanced Encryption Standard (AES)

with Galois/Counter Mode (GCM) cryptography algorithm for authenticated encryption ("MACsec encryption"). The sender device (e.g., network device 104) can encrypt the data and transmit the data in ciphertext on a LAN link. The receiver device decrypts the received encrypted data and then carries out other processing. In an example, MACsec standard encrypts fields after the SecTAG which obfuscates fields such as Multiprotocol Label Switching (MPLS) labels from the original Ethernet frame. An intermediary network device that may require those tags is not able to see them as the Ethernet frame traverses the underlying transport network.

In an example, the receiver device is configured to accept both MACsec protected and non-MACsec packets. When a packet enters a receiving (Rx) channel of an interface on the receiver device, the packet is inspected to check if the packet contains a SecTAG. If the packet contains a SecTAG, the packet is passed to a "controlled port" where the packet goes through the MACsec decryption before going through the rest of the forwarding pipeline. If the packet does not contain a SecTAG, the packet is handed to an "uncontrolled port" where the hardware is configured to not drop the packet and pass it over the rest of the forwarding pipeline. In other words, both transmitting (Tx) and receiving (Rx) channels are not forced to only transmit and receive MACsec protected frames. They are configured to accept non-MACsec frames and process them as any other packet.

MACsec also provides integrity through an Integrity Check Value (ICV). ICV is a cryptographic digest function dependent on the data and the SAK. The ICV is used to authenticate Ethernet frames before the CRC fields. This ensures that any tampering with the frame will be detected.

In an example implementation, a MACsec capable port on the sender device (e.g., network device 104) may be used for performing MACsec encryption service and another such port may be used for MACsec decryption service. The ports may be configured in internal loopback mode. Any packet that is to be MACsec encrypted due to a PSP-related policy may be redirected to the port configured for MACsec encryption service. The original destination port for the packet is recorded in the packet metadata which is preserved in the sender device through a recirculation. Once the packet recirculates back into the hardware post MACsec encryption, a first ternary content-addressable memory (TCAM) rule may be installed to redirect any packet arriving on the port (providing MACsec encryption) to the original destination port available in the packet metadata. On similar lines, when a packet with a SecTAG arrives on an uplink port, a second TCAM rule may redirect such packet to the port providing MACsec decryption services. The packet enters the hardware back post decryption and the original source port of the packet preserved in the packet metadata is restored and used further for making forwarding decision on the packet.

In another example, the action can include abstaining from applying the PSP to a network flow of the application, which is received by the network device 104. As used herein, the term "abstain" refers to refrain deliberately from the action of applying a PSP-based encryption to the network flow of a source application. In an example, abstaining includes refraining from applying MACsec (including MACsec encryption) to a network flow of the application.

FIG. 2 illustrates a lookup table 200, according to an example. As mentioned earlier, a lookup table can be used to provide an output for each input. The lookup table 200 can include, for example, an output value(s) on each line. The value(s) can be in the form of, for example, a byte, a word, and an integer. In an example, the lookup table can include multiple elements (e.g., an input and an output corresponding to the input) on a single line. A device (e.g., network device 104) can simply "look up" what the output value(s) should be for any given input.

Once the lookup table is created, a read command can be used to read data from it. In an example, the read command can use the name of the table, the location of the item to retrieve, and a variable to store the retrieved number in.

In an example, the lookup table 200 can be used to denote a point-to-point security protocol (PSP)-related policy for an application. In an example, separate PSP-related policies can be denoted depending on the application. For example, a PSP-related policy can be denoted depending on whether a network flow from an application is it to be "encrypted" or "not encrypted". An enterprise can select whether a network flow from an application is it to be "encrypted" or "not encrypted. An enterprise may choose to select, for example, a video sharing application (e.g., YouTube), a content streaming application (e.g., Netflix), and a social media application (e.g., Facebook) as applications whose network flows are not to be encrypted. On the other hand, network flows from applications such as an email application (e.g., MS Outlook), GitHub, and a messaging application (e.g., MS Teams) may be selected for encryption.

In an example, a 'value' (e.g., a byte, a word, and an integer) in the lookup table 200 can be used to denote a PSP-related policy for an application. In the example of FIG. 2, the lookup table illustrates two columns. The first column 202 includes an application ID for an application (e.g., Facebook, YouTube, and GitHub) and the second column 204 includes a value assigned to the application ID of the application. The value in the second column denotes the point-to-point security protocol (PSP)-related policy for the application (represented via the application ID).

In an example, the value can be defined using a binary number system. A binary number system represents a number in terms of only two digits: 0 (zero) and 1 (one). In an example, in a given line of the look up table, if the value (in the second column) corresponding to an application ID (in the first column) is "0", it can indicate that PSP (e.g., MACsec) is to be applied to the network packets of the network flow from the application corresponding to the application ID. In another example, if the value (present in the second column) corresponding to an application ID (present in the first column) is "1", it can indicate that PSP (e.g., MACsec) is not to be applied to the network packets of the network flow from the application corresponding to the application ID. In another example, two digits: 0 (zero) and 1 (one) can be used to represent the values vice versa.

An advantage of using the lookup table is that the lookup table is memory efficient to read, compared to an equivalent set of command statements that may be required to be given to read data.

FIGS. 3A and 3B illustrate an unencrypted network packet 300A and an encrypted network packet 300B, respectively, according to some examples. The structure of an unencrypted network packet 300A can consist of three parts: header 302, payload 304 and trailer 306.

The header 302 contains instructions about the data carried by the network packet. These instructions may include length of the network packet, synchronization information (bits that help the packet match with the network), a packet number, protocol information 312 (that defines what type of packet is being transmitted), the destination address 312 (where the packet is going), and the source address 308 (where the packet came from).

The payload 304 is the actual data that the network packet is delivering to the destination address. In this example, the payload appears immediately after the header. Network protocols can specify the maximum length allowed for packet payloads. In an example, the payload can include the application ID 316 of an application that generated the network packet. The application ID is a unique value assigned to the application, which is used to identify the application.

The trailer 306 (also referred to as the footer) contains bits that tell the recipient device that it has reached the end of the packet. The trailer may also include an error checking mechanism such as Cyclic Redundancy Check (CRC) 314, which is an error-detecting code commonly used in digital networks and storage devices to detect accidental changes to digital data.

The structure of an encrypted network packet 300B protected by MACsec can, in addition to the parts of an unencrypted network packet (e.g., 300A), include a MACsec header 342 as shown in FIG. 3B. MACsec adds a 32-byte header 342 to each Ethernet frame that is protected by MACsec. In the encrypted network packet 300B, the payload 304 including the application ID 316 of an application that generated the network packet is encrypted.

Figure 4:
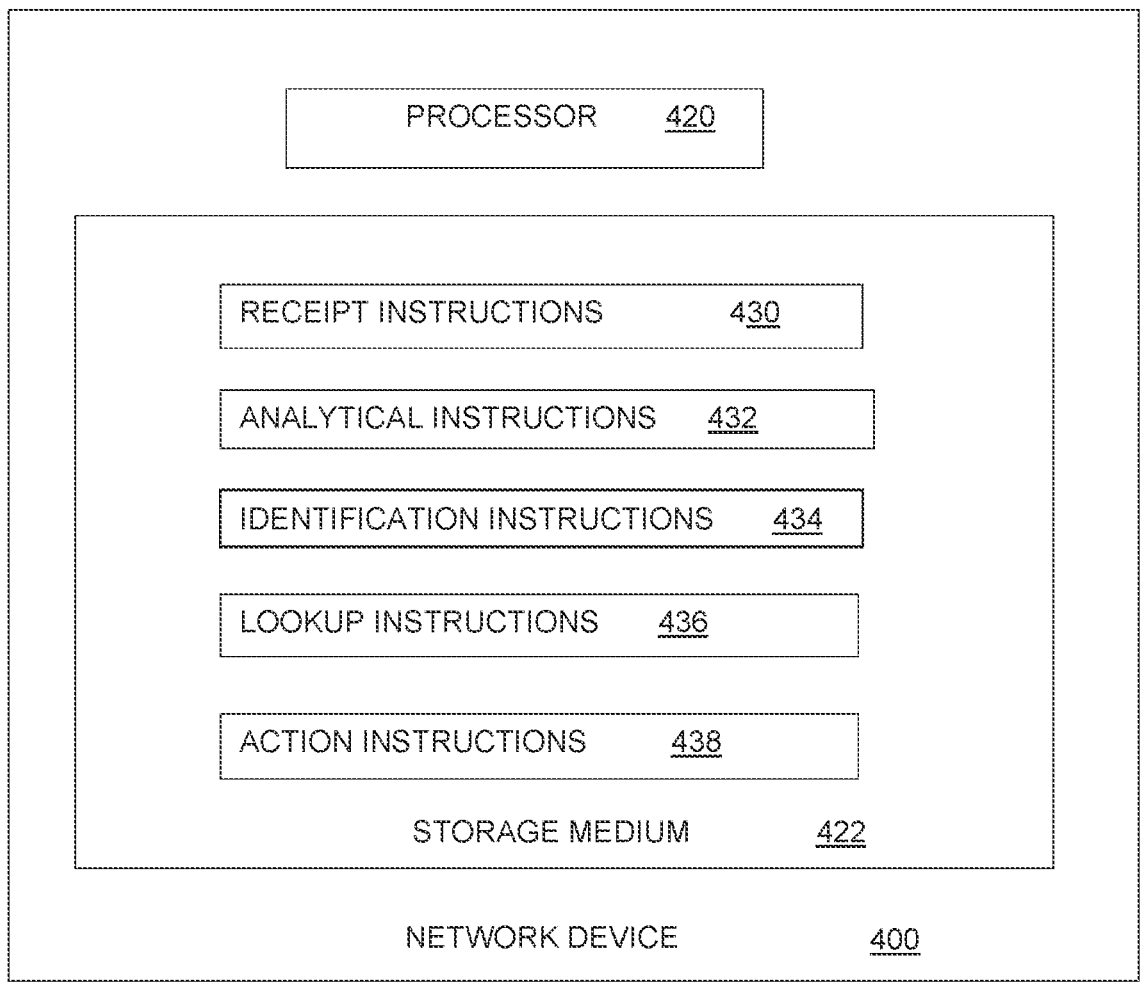
FIG. 4 is a block diagram of a network device, according to some examples.

FIG. 4 illustrates a block diagram of a network device 400, according to some examples. The network device can be analogous to the network device 104 of FIG. 1, in which like reference numerals correspond to the same or similar, though perhaps not identical components. For the sake of brevity, components or reference numerals of FIG. 4 having the same or similarly described function in FIG. 1 are not being described in connection with FIG. 4. Said components or reference numerals may be considered alike.

The network device 400 can include a processor 420 (or multiple processors) and a storage medium 422. Processor 420 can include one or multiple Central Processing Unit (CPU), microprocessor, programmable gate array, microcontroller, or any other processing logic that interprets and executes machine-readable instructions stored in storage medium 422.

The storage medium 422 can store information and machine-readable instructions executable on the processor 420 to perform various tasks. The storage medium 422 can be Synchronous DRAM (SDRAM), Double Data Rate (DDR), Rambus DRAM (RDRAM), Rambus RAM, etc., or storage memory media such as a floppy disk, a hard disk, a CD-ROM, a DVD, a pen drive, and the like.

In an example, processor 420 executes receipt instructions 430 to receive a network flow from a network client on a network. In an example an application on a network client (e.g., workstation, desktop computer, and notebook computer) can generate a network flow. The network flow includes a network packet(s) comprising an application ID that uniquely identifies the application. In an example, processor 420 can execute receipt instructions 430 to establish a network connection with the network client over an Ethernet network. Processor 420 can then obtain the network flow from the network client over the Ethernet network.

Processor 420 executes analytical instructions 432 to analyze a network packet of the network flow. As mentioned earlier, the network packets in the network flow can include an application ID of the source application that generated the flow. The application ID can be present, for example, in the payload section of a network packet. The analytical instructions, when executed can include performing a deep packet inspection of the network packet(s) in the network flow.

Processor 420 executes identification instructions 434 to identify an application ID of the source application that generated the network packets. The deep packet inspection can look at the payload of a network packet(s) to identify the application ID of the source application.

Processor 420 executes lookup instructions 436 to refer to a lookup table in an IC of the network device that includes a PSP-related policy for the source application. Once the application ID of the source application is identified, lookup instructions 436 can be executed to identify a PSP-related policy mapped to the application ID. In an example, a look up table in an ASIC of the network device includes a mapping between an application ID and the PSP-related policy which is to be applied to a network flow of the application corresponding to the application ID. The lookup instructions 436 identify such mapping from the ASIC of the network device for a given application ID.

Based on the PSP-related policy in the lookup table, processor 420 executes action instructions 438 to abstain from applying a PSP-based encryption to the network flow of the source application. In an example, if the PSP-related policy mapped to an application ID in the lookup table indicates that PSP-based encryption is not to be applied to a network flow of the source application, the action instructions refrain the network device from applying PSP-based encryption to the network flow of the source application.

Figure 5:
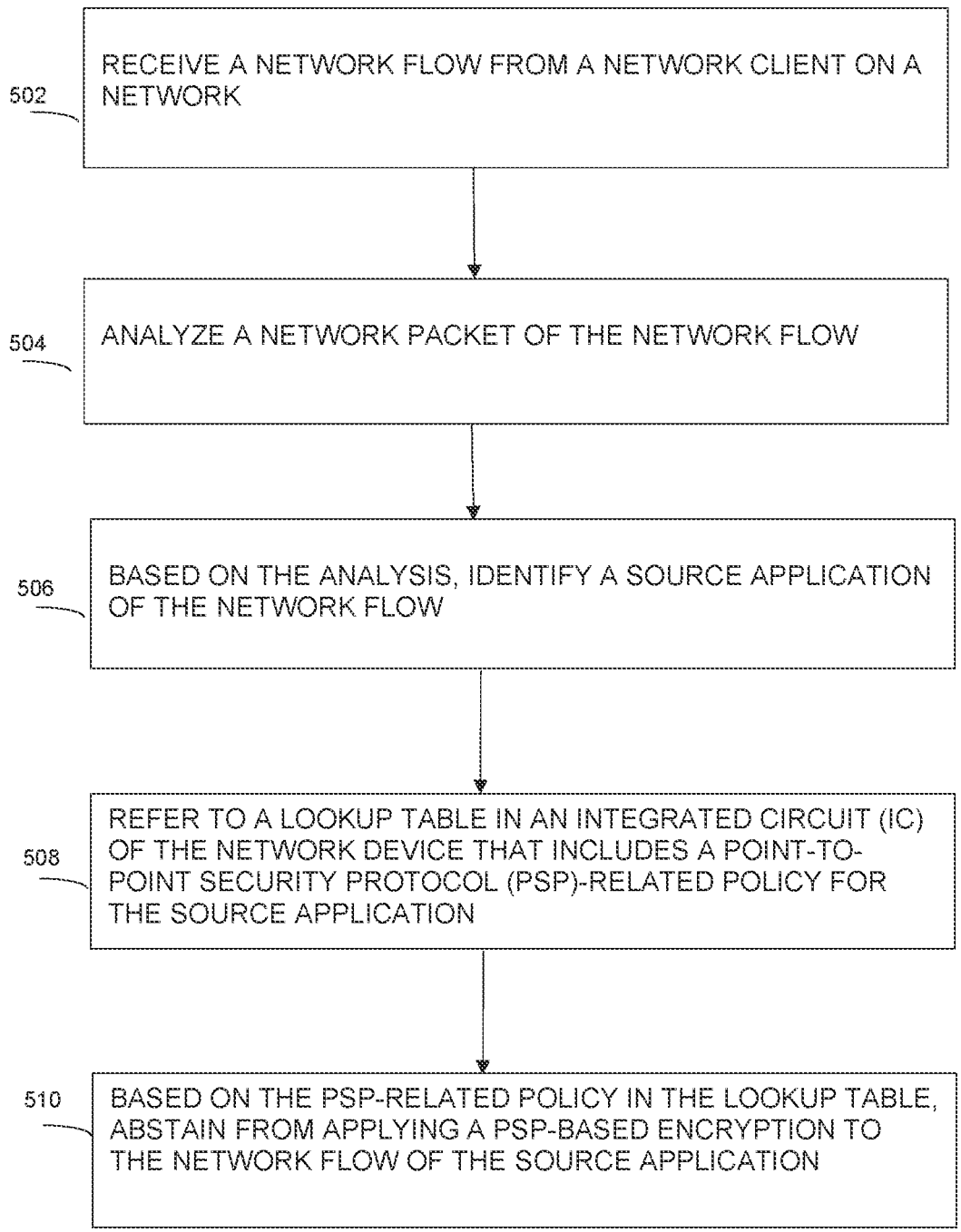
FIG. 5 is a flowchart of a method, according to some examples.

FIG. 5 is a flowchart of method 500, according to some examples. Method 500 can be performed by a network device. For example, method 500 can at least partially be executed on the network device 104 of FIG. 1 or the network device 400 of FIG. 4.

At block 502, method 500 includes receiving, by a network device, a network flow from a network client on a network. In an example, receiving comprises establishing a network connection with the network client over an Ethernet network and obtaining the network flow from the network client over the Ethernet network.

At block 504, method 500 includes analyzing, by the network device, a network packet of the network flow. In an example, analyzing comprises performing a deep packet inspection of the network packet from the network flow and identifying an application ID associated with the source application from the network packet.

Based on the analysis, at block 506, method 500 includes identifying, by the network device, a source application of the network flow. In an example, identifying comprises identifying, based on the application ID present in the network packets, the application corresponding to the application ID.

At block 508, method 500 includes referring to, by the network device, a lookup table in an IC of the network device that includes a PSP-related policy for the source application. In an example, a lookup table or data structure in the IC can include a mapping between the application ID of an application and a MACsec-related policy for the source application. A MACsec-related policy for an application is defined in a lookup table to enable the network device to determine an action related to the MACsec-related policy on the network flow of the application, which is received by the network device. In an example, the action can include applying MACsec protocol (as defined by IEEE 802.1AE standard) to a network flow of the application.

Based on the PSP-related policy in the lookup table, at block 510, method 500 includes, abstaining, by the network device, from applying a PSP-based encryption to the network flow of the source application. In an example, the action can include abstaining from applying the MACsec protocol (as defined by IEEE 802.1AE standard) to a network flow of the application. In an example, applying the MACsec protocol to a network flow of the application can include applying an encryption (e.g., MACsec encryption) to a network flow of the application. In an example, abstaining comprises refraining from applying the MACsec encryption on a downlink port of the network device.

Figure 6:
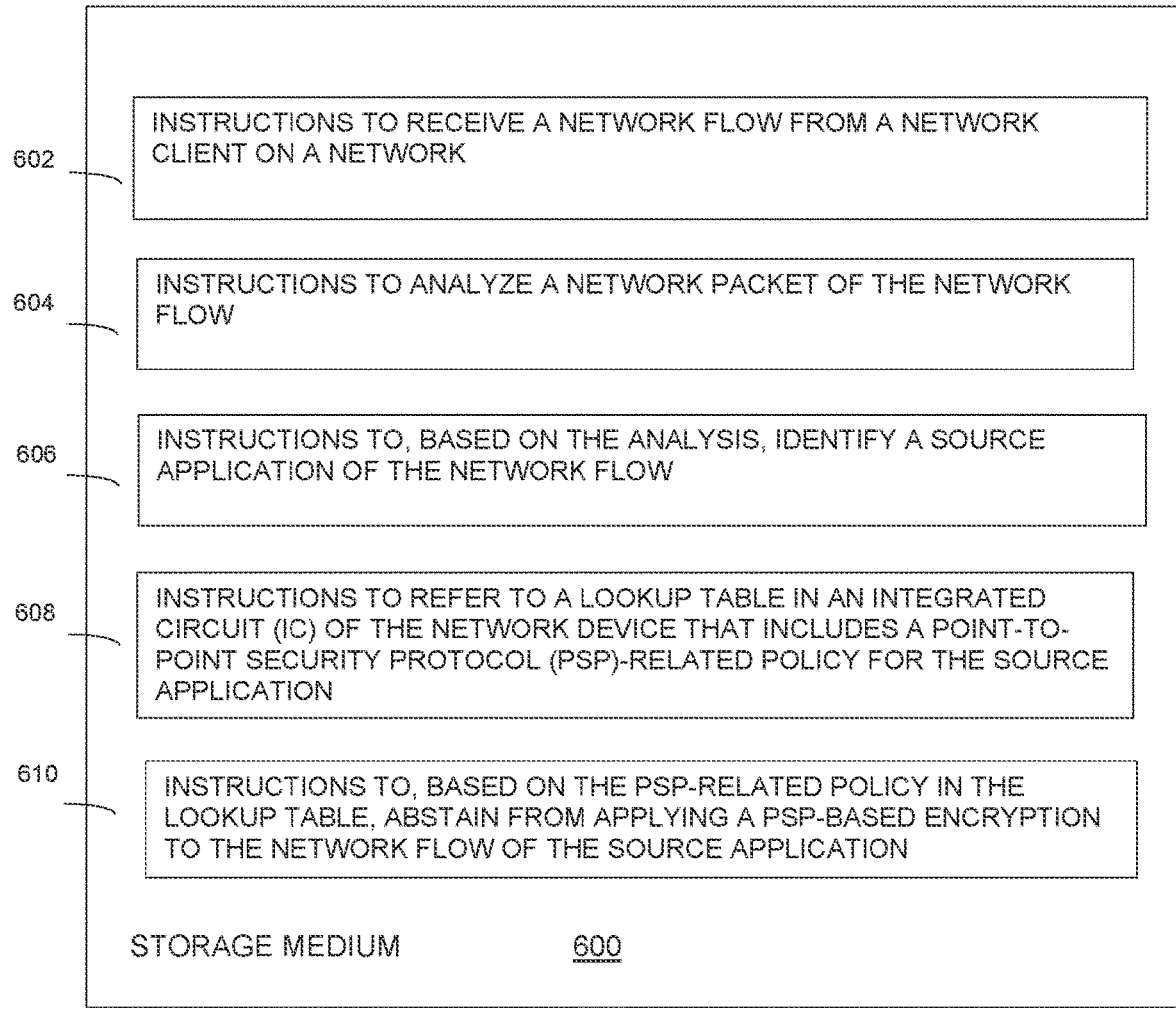
FIG. 6 is a block diagram of a storage medium storing machine-readable instructions, according to some examples.

FIG. 6 is a block diagram of a non-transitory machine-readable or computer-readable storage medium 600 storing machine-readable instructions that upon execution cause a network device to perform various tasks. The network device can include the network device 104 of FIG. 1 or network device 400 of FIG. 3.

The machine-readable instructions include instructions 602 to receive a second network flow from the network client on the network. The machine-readable instructions include instructions 604 to analyze a network packet of the second network flow. Based on the analysis, the machine-readable instructions include instructions 606 to identify a second source application of the second network flow. The machine-readable instructions include instructions 608 to refer to the lookup table in the IC of the network device that includes the PSP-related policy for the second source application. Based on the PSP-related policy for the second source application, the machine-readable instructions include instructions 610 apply a PSP-based encryption to the second network flow of the second source application.

For simplicity of explanation, the example method of FIG. 5 is shown as executing serially, however, it is to be understood and appreciated that the present and other examples are not limited by the illustrated order. The example systems of FIGS. 1, 4, and 6, and the method of FIG. 5 may be implemented in the form of a computer program product including computer-executable instructions, such as program code, which may be run on any suitable computing device in conjunction with a suitable operating system (for example, Microsoft Windows®, Linux®, UNIX®, and the like). Examples within the scope of the present solution may also include program products comprising non-transitory computer-readable media for carrying or having computer-executable instructions or data structures stored thereon. Such computer-readable media can be any available media that can be accessed by a general-purpose or special-purpose computer. By way of example, such computer-readable media can comprise RAM, ROM, EPROM, EEPROM, CD-ROM, magnetic disk storage or other storage devices, or any other medium which can be used to carry or store desired program code in the form of computer-executable instructions, and which can be accessed by a general-purpose or special-purpose computer. The computer-readable instructions can also be accessed from memory and executed by a processor.

It should be understood that the above-described examples of the present solution are for illustration. Although the solution has been described in conjunction with a specific example thereof, numerous modifications may be possible without materially departing from the teachings and advantages of the subject matter described herein. Other substitutions, modifications, and changes may be made without departing from the spirit of the present solution. All of the features disclosed in this specification (including any accompanying claims, abstract, and drawings), and/or all of the steps of any method or process so disclosed, may be combined in any combination, except combinations where at least some of such features and/or steps are mutually exclusive.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on one claim, the disclosure of various implementations includes each dependent claim in combination with every other claim in the claim set.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

As used herein, the articles "a" and "an" are intended to include one or more items and may be used interchangeably with "one or more." Further, as used herein, the article "the" is intended to include one or more items referenced in connection with the article "the" and may be used interchangeably with "the one or more." Also, as used herein, the terms "has," "have," "having," or the like are intended to be open-ended terms. As used herein, the term "includes" is intended to mean "includes but not limited to", and the term "including" is intended to mean "including but not limited to". Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

The invention claimed is:

1. A method comprising:
   receiving at a data link layer of a network, by a network device, a network flow including an application ID from a network client on the network;
   analyzing, by the network device, a network packet of the network flow;
   based on the analysis, extracting, by the network device, the application ID from the network flow and identifying an associated source application of the network flow;
   referring to, by the network device, a point-to-point security protocol (PSP)-related policy for the associated source application based on the application ID, wherein the point-to-point protocol is a network security protocol that operates at a medium access control sublayer of the data link layer of the network; and
   based on the PSP-related policy for the extracted application ID of the associated source application, abstaining, by the network device, from applying a PSP-based encryption to the network flow of the source application.

2. The method of claim 1, wherein abstaining comprises:
   accessing a lookup table in an integrated circuit (IC) of the network device that includes the PSP-related policy for the source application;
   determining the PSP-related policy for the source application in the lookup table; and
   in response to determining that the PSP-related policy for the source application is not to apply the PSP-based encryption to the network flow of the source application, refraining from applying the PSP-based encryption to the network flow of the source application.

3. The method of claim 1, wherein receiving comprises:
   establishing a network connection with the network client over an Ethernet network; and obtaining the network flow from the network client over the Ethernet network.

4. The method of claim 1, wherein analyzing comprises:
performing a deep packet inspection of the network packet from the network flow; and
extracting the application ID associated with the source application from a payload area of the network packet.

5. The method of claim 1, further comprising:
determining the PSP-related policy for the source application in a lookup table; and
in response to determining that the PSP-related policy for the source application is to apply the PSP-based encryption to the network flow of the source application, applying the PSP-based encryption to the network flow of the source application.

6. The method of claim 1, wherein abstaining comprises refraining from applying the PSP-based encryption on a downlink port of the network device.

7. A network device comprising:
a processor; and
a non-transitory storage medium storing instructions that, when executed by the processor, cause the network device to:
receive at a data link layer of a network a network flow including an application ID from a network client on the network;
analyze a network packet of the network flow;
based on the analysis, extract the application ID from the network flow and identify an associated source application of the network flow;
refer to a point-to-point security protocol (PSP)-related policy for the associated source application based on the application ID, wherein the point-to-point protocol is a network security protocol that operates at a medium access control sublayer of the data link layer of the network; and
based on the PSP-related policy for the extracted application ID of the associated source application, abstain from applying a PSP-based encryption to the network flow of the source application.

8. The network device of claim 7, wherein the PSP-related policy comprises a policy related to Media Access Control security (MACsec) protocol.

9. The network device of claim 7, wherein the PSP-based encryption comprises a MACsec protocol encryption.

10. The network device of claim 7, wherein the network client and network device are physically connected devices.

11. The network device of claim 7, wherein the network client and network device are part of separate networks.

12. The network device of claim 7, wherein the PSP-related policy is present in a lookup table of an IC.

13. The network device of claim 7, wherein the instructions executable by the processor are to further:
receive, at the data link layer of the network, a second network flow including an application ID from the network client on the network;
analyze a network packet of the second network flow;
based on the analysis, extract the application ID from the second network flow and identify an associated second source application of the second network flow;
refer to the PSP-related policy for the second source application based on the application ID; and
based on the PSP-related policy for the extracted application ID of the associated second source application, apply a PSP-based encryption to the second network flow of the second source application.

14. The network device of claim 7, wherein, to abstain from applying a PSP-based encryption to the network flow of the source application, the instructions, when executed, are to:
access a lookup table in an IC of the network device that includes the PSP-related policy for the source application;
determine the PSP-related policy for the source application in the lookup table; and
in response to a determination that the PSP-related policy for the source application is not to apply the PSP-based encryption to the network flow of the source application, refrain from applying the PSP-based encryption to the network flow of the source application.

15. A non-transitory machine-readable storage medium comprising instructions that upon execution cause a network device to:
receive at a data link layer of a network a network flow including an application ID from a network client on the network;
analyze a network packet of the network flow;
based on the analysis, extract the application ID from the network flow and identify an associated source application of the network flow;
refer to a point-to-point security protocol (PSP)-related policy for the associated source application based on the application ID, wherein the point-to-point protocol is a network security protocol that operates at a medium access control sublayer of the data link layer of the network; and
based on the PSP-related policy for the extracted application ID of the associated source application, abstain from applying a PSP-based encryption to the network flow of the source application.

16. The storage medium of claim 15, wherein the network comprises an Ethernet network.

17. The storage medium of claim 15, wherein the source application is one of a video sharing application, a content streaming application, and a social media application.

18. The storage medium of claim 15, wherein, to abstain from applying a PSP-based encryption to the network flow of the source application, the instructions upon execution cause the network device to:
access a lookup table in an IC of the network device that includes the PSP-related policy for the source application;
determine the PSP-related policy for the source application in the lookup table; and
in response to a determination that the PSP-related policy for the source application is not to apply the PSP-based encryption to the network flow of the source application, refrain from applying the PSP-based encryption to the network flow of the source application.

19. The storage medium of claim 15, wherein, to analyze, the instructions upon execution cause the network device to:
perform a deep packet inspection of the network packet from the network flow; and
extract the application ID associated with the source application from a payload area of the network packet.

20. The storage medium of claim 15, wherein, to receive, the instructions upon execution cause the network device to:
establish a network connection with the network client over an Ethernet network; and
obtain the network flow from the network client over the Ethernet network.

* * * * *